(No Model.)
J. THINNES.
CASTER.
No. 438,506. Patented Oct. 14, 1890.
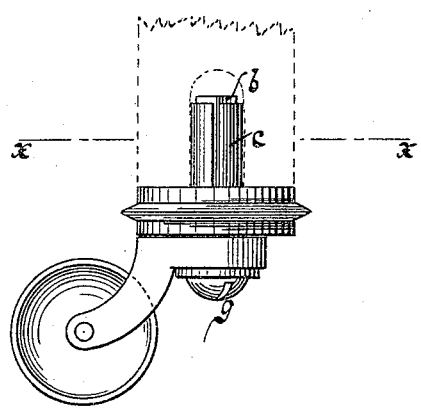
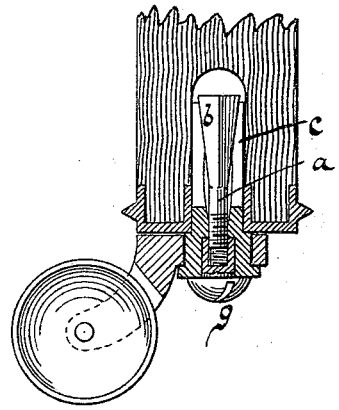
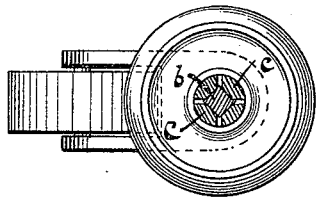
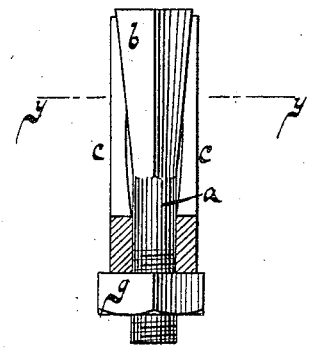
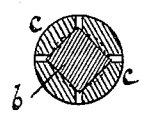
WITNESSES:
William Miller
Edward Wolff
INVENTOR:
Jacob Thinnes.
BY
Van Santvoord & Hauff
ATTORNEYS

UNITED STATES PATENT OFFICE.

JACOB THINNES, OF BROOKLYN, NEW YORK.

CASTER.

SPECIFICATION forming part of Letters Patent No. 438,506, dated October 14, 1890.

Application filed August 14, 1890. Serial No. 362,041. (No model.)

*To all whom it may concern:*

Be it known that I, JACOB THINNES, a citizen of the United States, residing at Brooklyn, in the county of Kings and State of New York, have invented new and useful Improvements in Fastenings for Casters, Knobs, &c., of which the following is a specification.

This invention relates to improvements in fastenings for such articles as casters, doorknobs, and the like; and the invention consists in the details of construction set forth in the following specification and claim, and illustrated in the accompanying drawings, in which—

Figure 1 is a side elevation of a fastening containing my invention. Fig. 2 is a vertical central section of Fig. 1. Fig. 3 is a section along $x$ $x$, Fig. 1. Fig. 4 is a detail view of a screw-rod and sleeve. Fig. 5 is a section along $y$ $y$, Fig. 4.

In the drawings, the letter $a$ indicates a screw-rod having a square or angular head or end $b$. The rod is fitted into a slit sleeve $c$, so as to leave the screw part projecting for the reception of a screw or nut $g$. In Fig. 2 is shown a screw, and in Fig. 4 a nut. The sleeve is placed into a suitable recess or hole in a piece of furniture—such as the leg of a table or a hole in a door—and when now the screw $g$ is tightened the head or enlarged end $b$ is drawn into the sleeve so as to expand the slit portion of said sleeve and clamp the sleeve firmly in place. The square end or head of the rod prevents the rod from turning in the sleeve. The screw $g$, besides acting on the rod $a$, may also be used to secure a caster, knob, or other article to the rod, so that when the rod is fastened in place it will also retain the caster or knob. If the rod is to be removed, the screw is loosened and the rod pushed inward, so as to allow the sleeve $c$ to contract, whereupon the sleeve and rod can be withdrawn from their place.

I do not claim anything shown and described in the Letters Patent issued to myself, Frederick Thinnes, and Charles Schueller, April 20, 1875, No. 162,433.

In the invention set forth in said Letters Patent the screw-rod is cone-shaped from where the screw-threads terminate to its end, so as to expand or force outwardly the slitted sleeve when the adjusting-nut is properly manipulated, and thereby cause the projections or fins on the exterior of the sleeve to penetrate and seat themselves in the wood-work. The connection thus made between the projections or fins and the wood-work are so firm and tight, caused by the action of the cone-shaped head and weight of the article of furniture, that it is extremely difficult to disconnect the sleeve from the wood-work when it is desired to detach the same. Considerable expense and difficulty are sustained in forming the projections or fins on the exterior of the sleeve, and also in forming the cone-shaped portion of the screw-rod. The cost and difficulty of forming both the cone-shaped screw-rod and projections on the sleeve are obviated by my present invention. The sleeve being free of projections on its exterior enables its removal, when desired, with comparative ease and facility and without resorting to the use of tools or marring of the furniture. The head of the screw being angular, it can be produced more cheaply than if cone-shaped, and as each angle-point of the rod bears in the slit between each section of the sleeve the rod exerts great positive pressure upon each section of the sleeve when the nut on the rod is operated, causing a firm binding contact between the sleeve and the wood-work without the aid of pins or projections on the exterior of the sleeve, which prior to my present invention were deemed absolutely essential. By forming the rod with the angular head each of its angles enters and seats itself between the sections of the sleeve, forcing each member thereof apart, thereby expanding the sleeve and with certainty preventing the rotation of the sleeve when the nut on the rod is properly turned to draw the angular head within the sleeve, and likewise prevents the rod from turning within the sleeve. By this construction neither the sleeve nor the rod can turn when the nut is operated to draw the rod within the sleeve for the purpose of expanding the members of the slitted sleeve.

What I claim as new, and desire to secure by Letters Patent, is—

The improved fastening for casters herein shown and described, combining in its structure the rod $a$, having at one end the enlarged angular head and at its other end a screw-thread, the nut $g$, and the tubular slitted sleeve $c$, having a plane exterior surface, each angle of the head of the rod having a seat in the recess between the sections of the slitted sleeve to prevent turning of the rod when drawn within the sleeve for expanding its sections, all substantially as herein set forth.

In testimony whereof I have hereunto set my hand in the presence of two subscribing witnesses.

JACOB THINNES.

Witnesses:
WM. C. HAUFF,
E. F. KASTENHUBER.